Oct. 17, 1961 R. S. WILKES 3,004,765
MATERIAL UNLOADER HAVING BEATER CHAINS OF ADJUSTABLE LENGTH
Filed Dec. 12, 1958 2 Sheets-Sheet 1

*INVENTOR.*
RAYMOND S. WILKES

ATTORNEYS

Oct. 17, 1961 R. S. WILKES 3,004,765
MATERIAL UNLOADER HAVING BEATER CHAINS OF ADJUSTABLE LENGTH
Filed Dec. 12, 1958 2 Sheets-Sheet 2
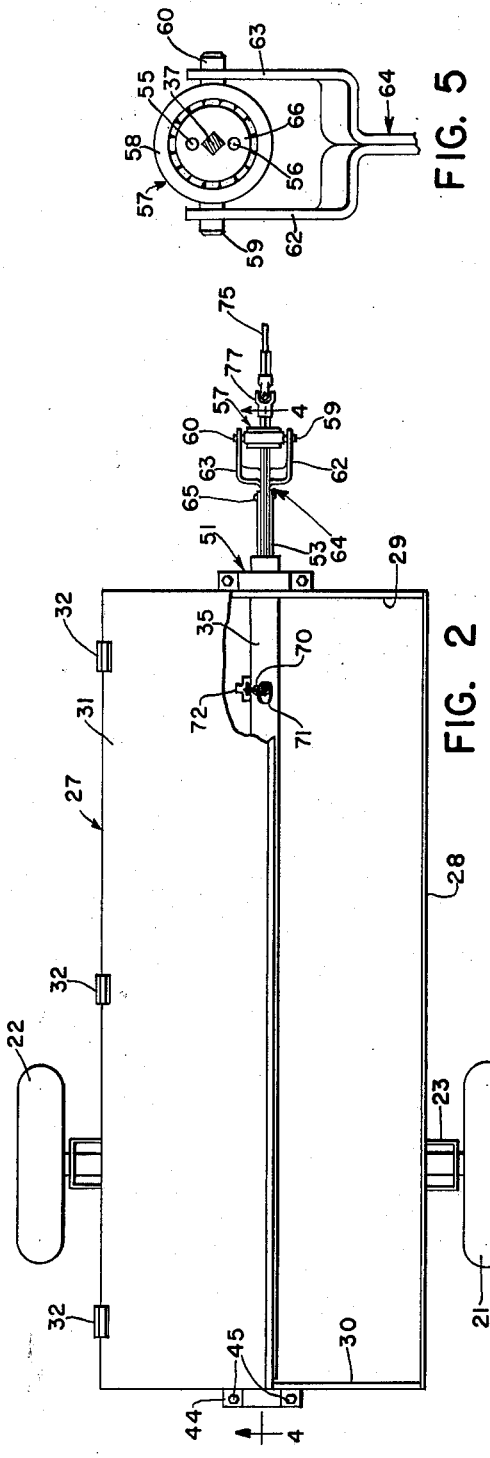
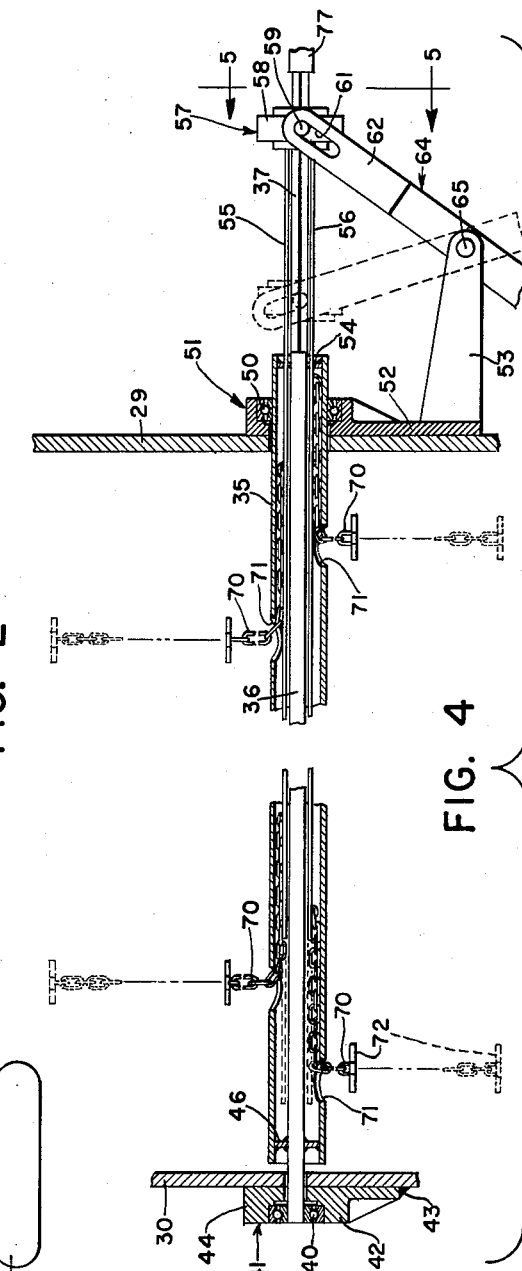
INVENTOR.
RAYMOND S. WILKES

United States Patent Office 3,004,765
Patented Oct. 17, 1961

3,004,765
MATERIAL UNLOADER HAVING BEATER
CHAINS OF ADJUSTABLE LENGTH
Raymond S. Wilkes, Moline, Ill., assignor to Deere &
Company, Moline, Ill., a corporation of Delaware
Filed Dec. 12, 1958, Ser. No. 780,054
11 Claims. (Cl. 275—3)

This invention relates to a material unloading implement. Still more particularly this invention relates to a manure spreader of a new and novel design and its associated drive mechanism, with beater chains of adjustable length.

This invention pertains to an improvement in a material unloading implement shown and described in a now pending application of Keith D. Elwick, Ser. No. 663,074, filed June 3, 1957, now Patent No. 2,886,332, dated May 12, 1959. In the material unloading structure there described, there is provided a main frame supporting an elongated material container having a partial cylindrical body. Supported on the container is a longitudinal shaft concentric with the axis of the cylindrical body. Axially spaced on the shaft are a series of flexible arms which operate, upon rotation of the shaft, to feed material over one side of the material body and onto the ground.

There are considerable advantages to the type of mechanism shown and described in the Elwick application, one of the primary advantages being that the flexible arms operate as beaters to completely pulverize material as it is discharged. Also of value is the simplicity of the unloading implement which reduces the overall manufacturing cost as well as the maintenance cost of the unit. Further, it has been found that the Elwick type of material unloader is more efficiently operated inasmuch as there is required only a single drive and only a single driven unit for the entire unloader.

One of the disadvantages of the aforementioned type of material unloader is that there is normally a very large initial load on the main drive, which is usually the power take-off shaft on the tractor, and depending upon the type of material to be unloaded, there may be a considerable large load on the power take-off shaft throughout the unloading operation. The initial load on the shaft is caused by the condition which arises due to the flexible arms resting within the material to be unloaded. Upon initial movement of the shaft and the arms, there is a very large load created since the arms must be dragged through the material and in most cases wrap themselves about the shaft prior to discharging the material. It is therefore one of the main objects of this invention to provide a simple mechanism for reducing the initial load on the power take-off shaft as well as reducing the load on the shaft throughout its operation.

Specifically it is proposed to construct the main shaft means in the container of inner and outer shaft means, with the inner shaft means being telescopingly arranged to move axially relative to the outer shaft means. Provided in the outer shaft means are a series of axially spaced apart arm openings which permit the flexible arm elements, which for purposes of the present description will be in the form of chains, to pass into the material container. The inner end of the flexible arm elements will be connected to the inner shaft means. With this arrangement, the free end of the arm elements may be positioned radially relative to the shaft by adjusting the inner shaft means axially within the outer shaft means, thereby threading out more or less of the chain as the load on the power take-off shaft permits.

It is further proposed in the present invention to provide a power unit in the form of a remote cylinder and linkage which may operate to move the inner shaft means axially.

Other objects and advantages of the present invention will become apparent to those skilled in the art as the nature of the invention is better understood from the following description and as shown in the accompanying drawings.

FIG. 2 is an enlarged plan view of the material unloader with portions broken away to more clearly show the internal mechanism of the unloader.

FIG. 4 is an enlarged vertical sectional view taken substantially along the line 4—4 of FIG. 2.

FIG. 5 is a sectional view taken substantially along the line 5—5 of FIG. 4.

Figure 1:
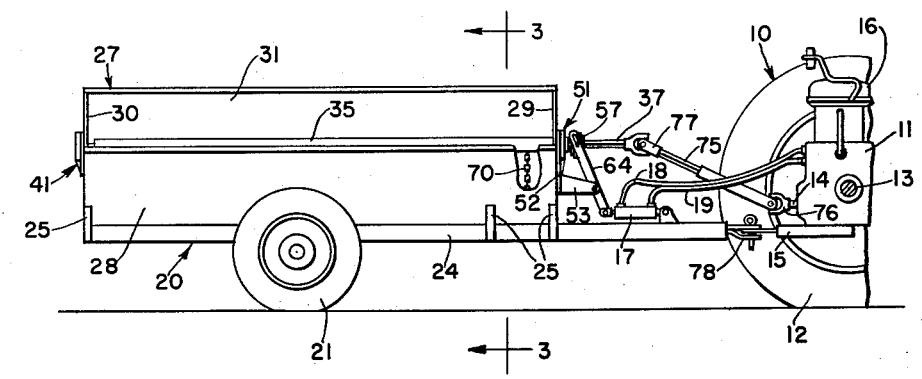
FIG. 1 is a side view of the material unloader and a rear portion of a tractor, portions of the material unloader and tractor having been removed to clearly show operating mechanism.

Referring now to FIG. 1, the tractor 10 is of conventional form having an elongated body 11 supported at its forward end by front steerable wheels, not shown, and at its rear by rear traction wheels, the left traction wheel being indicated at 12, and a rear transverse axial structure 13. The tractor 10 is also characterized by having a conventional power take-off shaft 14 extending rearwardly from the tractor body 11 and a drawbar 15 fixed to the underside of the tractor body 11. The tractor is operated from an operator's station 16, with the control levers for operating a power take-off shaft 14 and a hydraulic system being available at that station. The hydraulic system, not shown, is enclosed within the tractor body 11 and operates a remote hydraulic cylinder 17 by means of hydraulic hoses 18, 19.

The material unloader includes an elongated main frame or chassis 20 supported at its rear by a pair of transport wheels 21, 22 mounted on a transverse axle structure 23. Extending forwardly and rearwardly from the axle structure 23 is an elongated channel member 24 having left and right hand arcuate shaped rib members 25, 26 respectively extending outwardly from opposite sides thereof. The ribs 25, 26 extend under and operate in conjunction with the channel member 24 to cradle or support an elongated fore-and-aft extending material containing body, indicated in its entirety by the reference numeral 27. The material containing body 27 includes an elongated semi-cylindrical shaped portion 28 enclosed at opposite ends by end walls or plates 29, 30. The semi-cylindrical shell 28 may be treated as a U-shaped member having opposite side walls 28a, 28b connected by a bottom wall 28c. Positioned outwardly of and adjacent the upper edge of the side wall 28b are a series of longitudinally spaced hinges 32. The hinges 32 connect a hood 31 to the side wall 28b. The hood 31 serves generally as a continuation of the semi-cylindrical shell leaving only a material discharge opening between its upper edge and the upper edge of the side wall 28a. The purpose of the hood 31 is to prevent material from discharging over the side wall 28b and also to guide material in its discharge over the side wall 28a and through the aforementioned discharged opening. Latch means, not shown, are provided for latching the hood in the position shown in FIGS. 1–3. Generally, the hood 31 may be removed or swung downwardly to permit the container 27 to be loaded.

Positioned internally and between the side walls 28a and 28b is rotary means in the form of an elongated tubular shell or hollow shaft element 35 which extends substantially the length of the container and has its forward end extending outwardly of the front wall 29. Mounted internally of and concentric with the shaft element 35 is a solid or rigid shaft 36 which is square in cross section at its forward end 37. The rear or main portion of the shaft 36 is round in cross section. The rear end of the shaft 36 is rotatably supported by a bearing 40 which is carried in a split type bearing housing 41, the lower half 42 of which is welded at 43 to the wall 30. The upper half 44 is bolted as at 45 to the lower half. The rear portion of the outer tubular shaft element 35 is mounted on the shaft 36 by means of a radial plate 46 which is welded to the outer surface of the shaft 36 and the inner surface of the shaft element 35. The forward end of the shaft element 35 extends through an opening in the front wall 29 and is rotatably mounted to the wall 29 by means of a bearing 50 which is supported in a split type bearing housing 51, the lower half of which includes a plate portion 52 which is fixed in a suitable manner to the front surface of the wall 29. Integral with the plate portion 52 is a forwardly extending bracket 53. A forward radial plate 54 at the forward end of the shaft 35 is also provided to mount the shaft 36 concentric with the shaft 35. Provided in the plate 54 are openings through which elongated elements or rods 55, 56 extend. The rods 55, 56 are contained in the space between the shafts 35, 36 with each having a portion extending forwardly of the material container to a bearing 57 which is slidable along the shaft 37. The bearing 57 includes an outer race 58 which has outwardly extending lugs 59, 60 extending through slots, only one of which is shown at 61 cut in upwardly extending legs 62, 63 of a bifucated lever member 64. The midportion of the lever 64 is pivotally mounted by a pivot pin 65 to the forward end of the bracket 53. The lower end of the lever 64 is connected to the ram end of the hydraulic cylinder 17. An inner race 66 of the bearing 57 is non-rotatable but slidably mounted on the square end 37 of the shaft 36. As clearly evident in FIGS. 1 and 4, extension and retraction of the cylinder 17 will cause movement of the bearing 57 axially along the forward end 37 of the shaft 36. Since the rods 55, 56 are fixed to the inner race 66 of the bearing 57, the rods or elements 55, 56 will more or less telescope or move axially relative to the tubular element or shaft 35. The bearing member 57 will permit the shaft 36 to be driven, without affecting the axial position of the bearing structure 57.

The material in the container 26 is generally removed from the container by means of radially extending arms, here shown in the form of chains 70 which extend through openings 71 in the tubular shaft 35. The inner end of the chains or arm elements 70 are connected to the rod members 55 or 56 and the outer or free ends extend into the container 26. Mounted on the outer ends of the chains 70 are drag member 72 which serve the purpose of aggressively contacting the material within the container as the shaft means rotates. The forward end 37 of the shaft 36 is connected for rotation to the power take-off shaft 14 by means of a telescoping type of drive shaft 75 connected at its forward end by means of a universal joint 76 to the power take-off shaft 14 and at its rear end to the shaft 36 by means of a second universal joint 77. The material unloader is further connected to the tractor by a clevis type connection 78 between the forward end of the channel member 24 and the drag bar 15.

Figure 3:
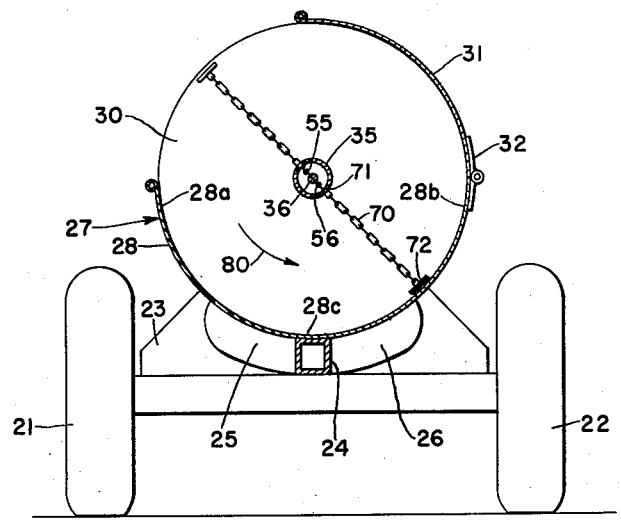
FIG. 3 is an enlarged sectional view taken substantially along the line 3—3 of FIG. 1.

In operation, the shaft 36 is driven in a counter-clockwise direction, as viewed in FIG. 3, and as indicated by the arrow 80. In normal operation of the material unloader, i.e., when the chains are in extended condition, upon initial rotation of the shaft 36, the chains 70 will tend to wrap themselves about the shaft, the wrapping condition occurring due to the fact that the drags 72 will tend to be held back by the material within the container. As the shaft continues to rotate, the chains will tend to unwrap themselves by centrifugal force and will contact the material next adjacent of the shafts to discharge material over the upper edge of the side wall 28a. Since the chains will tend to unwind, the material will be completely swept from the container by means of the chains 70 and the drags 72 when the chains are completely extended, the latter condition of the chains being shown in FIG. 3.

However, under many conditions, the material contained in the container 26 will be of such substance and will so completely cover the rotary structure that there would be created a relatively large load on the shaft by the resistance of the chains to move through the material. Should the load on the shaft 36 become too large, it is the purpose of the linkage 64 and hydraulic cylinder 17 to operate to axially drive the rods 55, 56 axially, through extension of the cylinder 17, so that the chains will be drawn internally of the hollow shaft 35. In this respect the shaft 35 operates as a structure providing a cylindrical shaped opening in the material and the chains are normally closely adjacent to the structure of shaft 35 and the shaft 36 and within the confines of the spacing between the shaft 36 and the cylindrical opening. This condition is generally shown in FIGS. 2 and 4. Consequently, the load required to draw the chains so that the drags 72 are adjacent the shaft 35 will be borne by the hydraulic cylinder 17. Therefore, the initial load on the shaft 35 or the load required to wrap the chains about the shaft 35 is held to a minimum inasmuch as the hydraulic cylinder retracts the chains. After the shaft 35 has begun rotation, should the load on the chains remain large so that difficulty occurs in throwing the material over the side of the container, the hydraulic cylinder may be operated to extend the chains to the degree necessary to keep a minimum or operative load on the chains. In this manner, the chains will be let out or extended only to the degree necessary to maintain optimum load on the drive shafts of the tractor. Consequently, the operator may from his operator's station on the tractor control the load on the shaft 36.

While only one form of the invention has been shown and described, it should be recognized that other forms and variations will occur to those skilled in the art without departing from the basic principles herein disclosed. Therefore, it should be understood that while the invention was shown and described in detail for purposes of fully and completely explaining the principles of the invention, it was not the intention to so limit or narrow the invention beyond the broad general nature herein claimed.

What is claimed is:

1. A material unloader of the type described including a main frame; an elongated material container mounted on the frame having oppositely disposed and spaced apart side walls; a hollow shaft supported on the frame between the side walls and extending substantially the length of the container, said shaft having therein a plurality of axially spaced arm openings; an axially movable element contained within the shaft; a plurality of flexible arm elements axially spaced along the shaft extending through said arm openings, each of said arm elements having an inner end connected to said axially movable element and an outer free end disposed in said container; means rotating the shaft for effecting discharge of the material by the arm elements; and means for moving the movable element axially for effecting the effective length of the arm elements in the container.

2. A material unloader of the type described including a main frame; an elongated material container mounted on the frame having oppositely disposed and spaced apart side walls; elongated rotary means supported on the frame between the side walls and extending substantially the length of the container, said rotary means including an elongated outer axial shell and an inner element contained within and movable relative to the shell, the outer shell having therein a plurality of axially spaced arm openings; a plurality of flexible arm elements axially spaced along the shaft means extending through said arm openings, each of said arm elements having an inner end connected to said inner element and an outer free end disposed in said container; means rotating the rotary means for effecting discharge of the material by the arm elements; and means effecting relative movement between the shell and movable element for effecting the effective length of the arm elements in the container.

3. A material unloader of the type described including a main frame; an elongated material container mounted on the frame; a shaft supported on the frame between the walls of the container and extending substantially the length of the container; a plurality of flexible arm elements axially spaced along the shaft, each of said arm elements having a radial inner end and an outer free end disposed in said container; means rotating the shaft for effecting discharge of the material by the arm elements; a rod substantially parallel to the shaft and movable relative thereto; means on the rod attaching the arm elements to the rod; and means effecting relative movement between the shaft and rod for adjusting the effective length of the arm elements in the container.

4. The invention defined in claim 3 further characterized in that said shaft is a hollow tubular member further characterized by having axially spaced openings, the rod is disposed internally of the shaft with one end thereof extending outwardly of the end of the shaft, the arm elements are in the form of chain members extending through the openings and into the material container, and the means effecting relative movement between the shaft and rod is in the form of a lever pivotally supported by the frame externally of the container, with means connecting it to said one end of the rod for effecting movement of the rod in response to movement of the lever.

5. A material unloader adapted for connection to a tractor having a power take-off shaft and a hydraulic system comprising: a main frame; an elongated material container mounted on the frame having oppositely disposed and spaced apart walls; a hollow shaft supported on the frame between the walls and extending substantially the length of the container and having therein a plurality of axially spaced arm openings; a plurality of flexible arm elements axially spaced along the shaft extending through said arm openings, each of said arm elements having its inner end within said hollow shaft and its outer free end disposed in said container; structure within the shaft movable relative thereto; means connecting the inner ends of the shaft to the structure; means for connecting the shaft to the power take-off shaft to effect rotation thereof; a hydraulic cylinder supported by the frame; hoses extending from the tractor hydraulic system to the hydraulic cylinder; means connecting the hydraulic cylinder to the structure to adjust the structure for effecting the effective length of the arms in the container.

6. A material unloader adapted for connection to a tractor having a power take-off shaft and a hydraulic system comprising: a main frame; an elongated material container mounted on the frame having oppositely disposed and spaced apart walls; shaft means supported on the frame between the walls and extending substantially the length of the container, said shaft means including an elongated shaft and an element mounted on the shaft and movable relative thereto; a plurality of flexible arm elements axially spaced along the shaft means and connected to the element; means on the shaft contacting said flexible arms for limiting radial displacement of the free end of the arms; means for connecting the shaft means to the power take-off shaft to effect rotation of the shaft means; a hydraulic cylinder supported by the frame; hoses extending from the tractor hydraulic system to the hydraulic cylinder; means connecting the hydraulic cylinder to the shaft means to adjust the relative position of the shaft and element for effecting the effective length of the arms in the container.

7. A material unloader of type described including: an elongated material container having a bottom and a pair of oppositely disposed sides extending upwardly from the bottom; elongated rotary means mounted in the container and spaced from the bottom and between the sides, said rotary means including a pair of relatively movable elements and at least one radial flexible arm having one end connected to the movable elements and responsive to relative movement between the elements to extend or retract radially; means effecting rotation of the rotary means; and means effecting relative movement between the elements.

8. A material unloader of the type described including: an elongated material container having a bottom and oppositely disposed side walls; an elongated hollow shaft supported in the container above the bottom and between the side walls; and arm extending from internally of the shaft radially outwardly of the shaft; means on the shaft adjustable to effect the radial extension of the arm outward of the shaft; and drive means rotating the shaft.

9. The invention defined in claim 8 in which the shaft has an arm opening therein, the arm is flexible and extends through the opening, and the means adjustable to effect the length of radial extension of the arm is in the form of a rod which is movably and adjustably supported within the shaft and relative to the arm opening, and the inner end of the arm is connected to the rod.

10. The invention defined in claim 9 further characterized by the rod being adjustable axially relative to the shaft and the rod has extension means beyond one end of the shaft, and further characterized by control means adjacent and outward the aforesaid end for adjusting the rod axially.

11. A material unloader including a main frame; an elongated material container mounted on the frame having oppositely disposed and spaced apart side walls; a rotor structure supported on the frame between and generally parallel to the side walls and including a main shaft, structure supported on the shaft providing a cylindrical opening in the material concentric with and spacedly from the shaft, a plurality of flexible arms supported by the shaft and adapted for extension and retraction between a position closely adjacent the shaft and the structure providing the cylindrical opening and a position in which the flexible arms are extending radially relative the axis of the shaft and beyond the structure providing the cylindrical opening; and means effecting rotation of the rotor structure.

References Cited in the file of this patent

UNITED STATES PATENTS

| | | |
|---|---|---|
| 582,210 | La Rue | May 11, 1897 |
| 1,076,061 | Quenner | Oct. 21, 1913 |
| 1,147,351 | Williams | July 20, 1915 |
| 2,886,332 | Elwick | May 12, 1959 |